(No Model.)

C. H. WADE, J. MOORES & H. O. FARRELL.
MAGNETO AND DYNAMO ELECTRIC GENERATOR.

No. 580,180. Patented Apr. 6, 1897.

Witnesses:
Harry Bailey
Frank S. Ober

Inventors:
Charles Henry Wade
James Moores
Henry Oliver Farrell
by their atty.
Wm. C. Rosenbaum

United States Patent Office.

CHARLES HENRY WADE, JAMES MOORES, AND HENRY OLIVER FARRELL, OF MANCHESTER, ENGLAND.

MAGNETO AND DYNAMO ELECTRIC GENERATOR.

SPECIFICATION forming part of Letters Patent No. 580,180, dated April 6, 1897.

Application filed January 5, 1897. Serial No. 618,018. (No model.) Patented in England October 27, 1896, No. 23,871, and October 30, 1896, Nos. 24,177 and 24,178.

*To all whom it may concern:*

Be it known that we, CHARLES HENRY WADE, JAMES MOORES, and HENRY OLIVER FARRELL, citizens of the United Kingdom of Great Britain and Ireland, residing at Manchester, in the county of Lancaster, England, have invented certain new and useful Improvements in Magneto and Dynamo Electric Generators, (patented in Great Britain October 27, 1896, No. 23,871, and October 30, 1896, Nos. 24,177 and 24,178,) of which the following is a specification.

This invention relates to improvements in connection with magneto and dynamo electric generators which have to run at variable speeds, and has for its object to insure the production by such machines of electric current having its range of voltage or pressure within narrower limits than the limits of the variation of speed. These improvements are more particularly intended for application to such small electric generators as are used in vehicles for the production of light and which machines are driven from the wheels or axles of such vehicles.

In carrying out our invention we divide the armature coil or coils into sections. Each coil is continuous in itself, as in ordinary machines, but at given points branches are led out and are connected to suitable terminals. Thus if it be supposed that a coil be divided into three sections we may lead out two branches. When the speed is slow, we may have the whole of the coil in circuit, as usual. When the speed increases, we arrange to lead the current out through the first branch, thus leaving a fewer number of turns of the coil to be energized by the field-magnets. When the speed further increases, we lead the current out by the second branch, and thus still further reduce the number of active turns in the coil. It is understood that the reduction in the number of active turns in the coil produces a reduction in the voltage of the external circuit.

We will more particularly describe our said invention with reference to the accompanying diagrams, which represent our improvements in their elementary form as applied to a machine having a Siemens armature of one coil.

Figure 1:
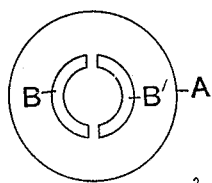
Figure 2:
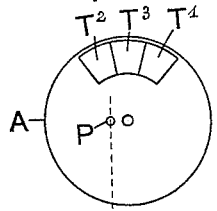
Figures 3, 4, 5:
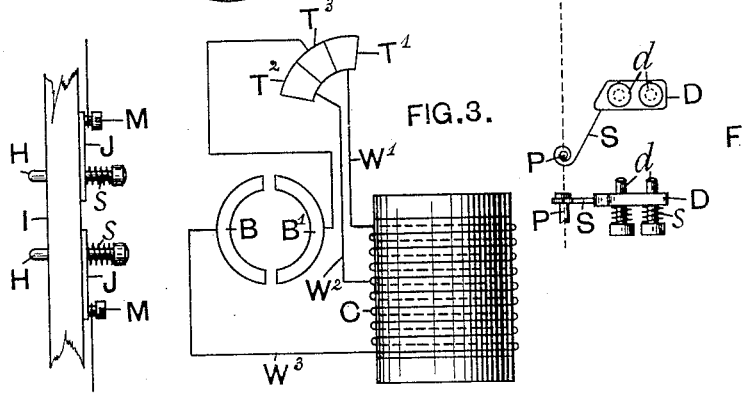

Figures 1 and 2 are views of opposite sides of a contact-disk. Fig. 3 is a diagram of the circuits and devices connected therein. Fig. 4 is a face and edge view of a special form of contact-block. Fig. 5 is a detail showing the construction of the main terminals and contact devices, and Figs. 6 and 7 illustrate modifications of the invention.

At one end of the armature there is a disk A, of insulating material, on which there is secured the two customary curved commutator-bars B, Fig. 1. It is, as indicated by Figs. 1, 2, 3, and 4, supposed that the armature-coil C is in this case divided into two sections only. At the back of the disk A there are arranged, as will be hereinafter described, three contact-terminals $T'$ $T^2$ $T^3$. To terminal $T'$ the end of the coil is connected by conductor $W'$. From nearer the middle of the coil another conductor $W^2$ is brought out and connected with terminal $T^2$. The beginning of the coil is connected by conductor $W^3$ with the commutator-bar B. There is a stud or pin P fixed eccentrically upon the disk, and on this there is a spring S, with a contact-block at its outer end. This contact-block D is capable of movement in contact with the terminals $T'$ $T^2$ $T^3$, under the influence of variations in the speed of rotation, and is of such dimensions that it must always be in touch with $T^3$ and with either $T'$ or $T^2$, $T^3$ being the common terminal from which the current is led out, as indicated by Fig. 3. When the machine is running at a low speed, the contact-block D is in contact with the terminals $T'$ $T^3$ and the circuit is through the whole of the armature-coil, conductor $W'$, terminal $T'$, contact-block D, and terminal $T^3$, which is electrically connected with the commutator-bar $B'$. The commutator-bar B is connected with the coil as indicated. When the speed increases, at a certain point determined by the strength of the spring S the contact-block will move over and make contact with the terminals $T^2 T^3$. The circuit is now through part only of the coil, conductor W², terminals T² T³, and to commutator-bar B', as before.

We prefer to employ a special form of contact-block D, as shown by Fig. 4. In the block there are two pins $d$, whose heads run upon the terminals T' T³, with which they are kept in close contact by the small spiral springs $s$ between the heads of the pins and the block.

Figure 6:
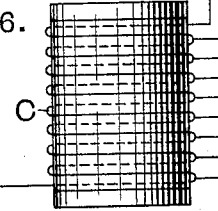
Figure 7:
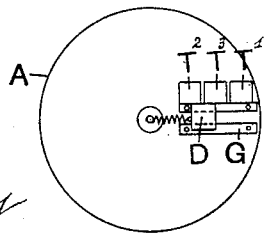

The modification represented by Fig. 6 differs in the number of sections of the coil, and consequently in the number of branches. The contact-block need in this case touch only one terminal at a time.

We have described the contact with successive branch terminals under the influence of accelerated speed as being effected by a spring, but we may use other devices. Thus, as indicated by Fig. 7, the block D may slide in suitable radial guides G under the restraint of a spiral spring or of a solenoid.

Instead of the ordinary brushes we use the pins H H in the support I, parallel with the disk A. The stems of these pins pass into or through the support and their heads come into touch with the commutator-bars, with which they are kept in contact by the spiral spring $s$. These pins may be in metallic contact, through the plates J J, with the machine terminals M M.

The construction may be varied by arranging the commutator-bars B B' upon the support I and the pins H H in substitution for the commutator-bars on the disk A. Also the terminals T' T³ may be on the front instead of the back of the disk A, and these terminals may be on a separate disk from that on which the commutator-bars are fixed.

Having now particularly described and ascertained the nature of our said invention and in what manner the same is to be performed, we declare that what we claim is—

1. In magneto and dynamo electric generators an armature-coil divided into two or more sections, a series of terminals to which the ends of each section are connected and which rotate with the armature, a contact adapted to slide over the successive terminals with variations of speed, and spring-controlled pin-rubbers for taking off the current, substantially as described.

2. In magneto and dynamo electric generators, a series of terminals connected with successive sections in the armature-coil, in combination with a contact-block moved over the terminals by centrifugal action and connected with one of the commutator-bars, substantially as described.

3. In magneto and dynamo electric machines, a contact-block or device in combination with a series of terminals connected with sections of the armature-coil, said block or device being moved over said terminals by centrifugal action, substantially as described.

4. In magneto and dynamo electric generators, a contact-block mounted upon a spring fixed at a point eccentric to the axis of rotation of the armature, and carrying at its outer end a contact-block moving under variations of speed, over a series of terminals connected with sections of the armature-coil, substantially as described.

In testimony that we claim the foregoing as our invention we have signed our names, in the presence of witnesses, this 11th day of December, 1896.

CHARLES HENRY WADE.
JAMES MOORES.
HENRY OLIVER FARRELL.

Witnesses to the signatures of Charles Henry Wade and Henry Oliver Farrell:
    GEO. FRANCIS DANIEL,
    WILLIAM E. HEYS.

Witnesses to the signature of James Moores:
    H. G. BISHOP,
    ARTHUR CARRICK.